P. STEGER.
COOKING UTENSIL.
APPLICATION FILED JUNE 12, 1909.

949,453.

Patented Feb. 15, 1910.

Witnesses:
H. St. Griffin
W. E. Smith

Inventor:
Peter Steger
By Joshua R. H. Potts
his Attorney.

UNITED STATES PATENT OFFICE.

PETER STEGER, OF OAK PARK, ILLINOIS.

COOKING UTENSIL.

949,453.  Specification of Letters Patent.  Patented Feb. 15, 1910.

Application filed June 12, 1909. Serial No. 501,765.

*To all whom it may concern:*

Be it known that I, PETER STEGER, a citizen of the United States, residing at Oak Park, county of Cook, and State of Illinois, have invented certain new and useful Improvements in Cooking Utensils, of which the following is a specification.

My invention relates to improvements in cooking utensils, the object of the invention being to provide a wire mesh vessel which may be placed inside of an ordinary kettle for the purpose of draining the water from vegetables or other food contained therein.

A further object is to provide a vessel of the character described which shall be simple in its construction, economical of manufacture, and convenient and serviceable.

Other objects will appear hereinafter.

With these objects in view my invention consists in the novel construction and arrangement of parts which will be hereinafter fully described and particularly pointed out in the appended claims.

Figure 1:
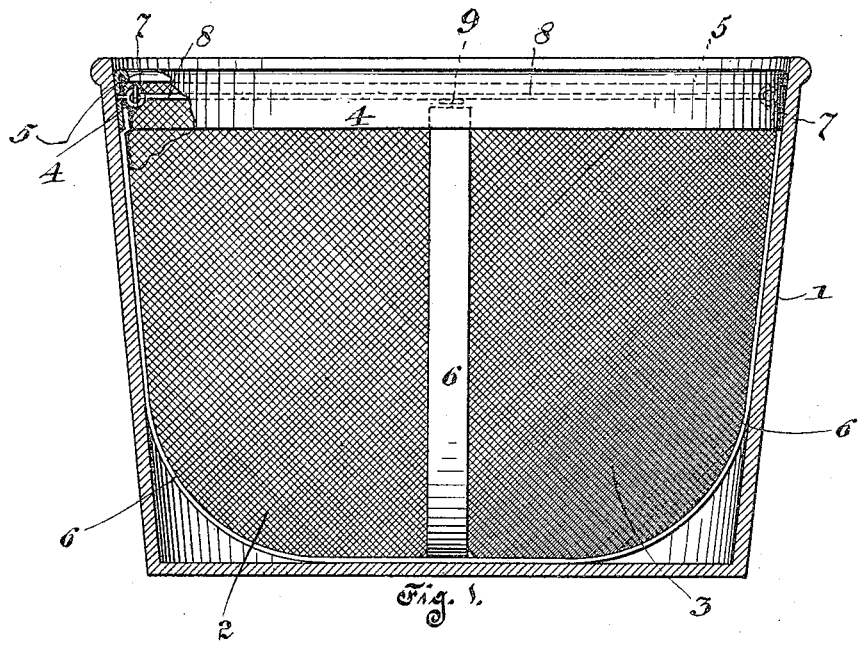
Figure 2:
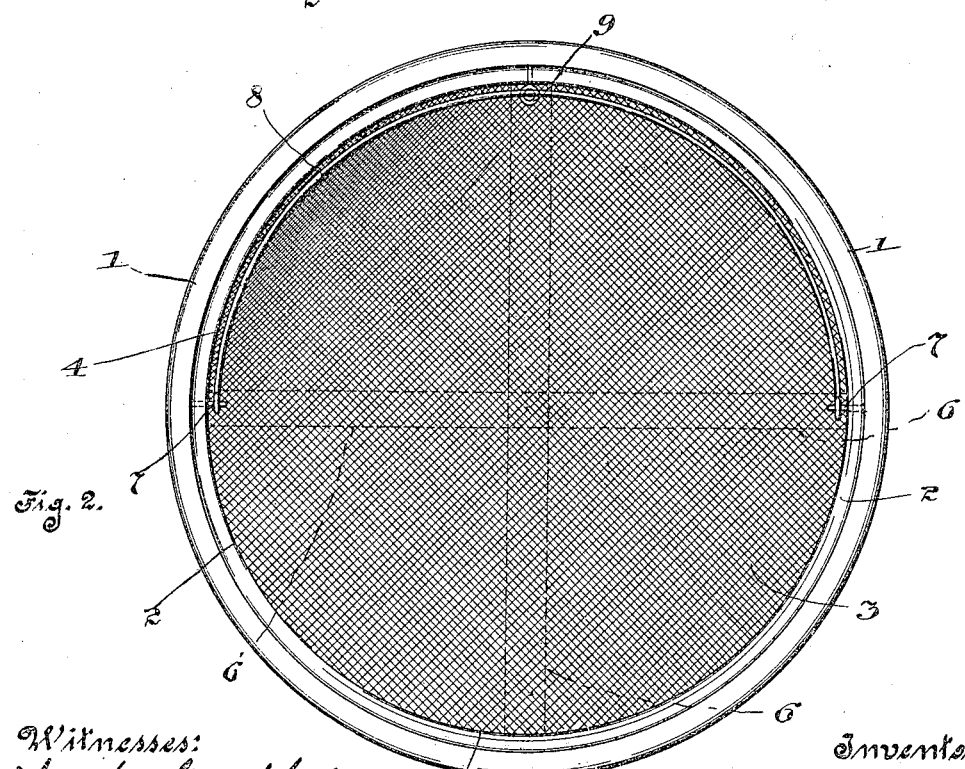

My invention will be more readily understood by reference to the accompanying drawings forming a part of this specification and in which, Figure 1 is a side elevation of my improved cooking utensil in its preferred form, the kettle in which it rests being shown in vertical section, and Fig. 2 is a top plan view thereof.

Referring now to the drawings 1 designates an ordinary kettle, and 2 my improved vessel constructed mainly of reticulated material 3 such as wire mesh. The vessel 2 is reinforced along its upper edge by a strong metallic band 4 having an inwardly extending flange 5 which is bent downwardly over the top edge of the wire mesh and securely connected thereto partly by soldering. To reinforce the walls and bottom of the wire mesh two U-shaped metallic members 6 are provided which are secured by soldering to the band 4, said members conforming to the wire mesh and crossing each other at the bottom of the vessel. Eyelets 7 for a bail 8 are provided on the inner side of the band 4, thus permitting the periphery of said band to come into close contact with the sides of the kettle 1. A portion of the outside of the members 6 are flush with and in alinement with the periphery of the band 4, and said members together with said band conform to and are reinforced by the walls of the kettle 1. An inwardly extending eyelet 9 spaced at 90 degrees from the eyelets is provided to act as a stop or rest for the bail 8, said eyelet 9 being riveted in the band 4. It will be seen that as the vessel 2 rests on the bottom of the kettle that nearly all of the available space in the kettle is utilized.

Various slight changes might be made in the general form and arrangement of parts described without departing from my invention, and hence I do not restrict myself to the precise details set forth but consider myself at liberty to make such changes and alterations as fairly fall within the spirit and scope of the appended claims.

Having described my invention what I claim as new and desire to secure by Letters Patent is:

1. In a device of the class described, a vessel having walls and a bottom of reticulated material, a reinforcing band secured to the upper edge of said material, inwardly extending eyelets secured to said band, and a bail pivoted to said eyelets, the periphery of said band being adapted to fit the inner walls of a kettle, substantially as described.

2. In a device of the class described, a vessel having walls and a bottom of reticulated material, a reinforcing band secured to the upper edge of said material, inwardly extending eyelets secured to said band, a bail pivoted to said eyelets, the periphery of said band being adapted to fit the inner walls of a kettle; and an eyelet projecting inwardly from said band and adapted to serve as a support for said bail, substantially as described.

In testimony whereof I have signed my name to this specification in the presence of two subscribing witnesses.

PETER STEGER.

Witnesses:
 HELEN F. LILLIS,
 JOSHUA R. H. POTTS.